June 15, 1965  A. L. JOHNSON  3,189,040
RELIEF VALVE
Filed Jan. 31, 1962

INVENTOR.
ARTHUR L. JOHNSON
BY

United States Patent Office 3,189,040
Patented June 15, 1965

3,189,040
RELIEF VALVE
Arthur L. Johnson, El Monte, Calif., assignor to F. C. Kingston Company, Los Angeles, Calif., a partnership
Filed Jan. 31, 1962, Ser. No. 170,035
6 Claims. (Cl. 137—469)

This invention relates to an improved valve construction and is more particularly concerned with an improved, spring loaded, pressure relief valve.

The ordinary pressure relief valve includes an elongate tubular body, a ported closure at one end of the body having a longitudinally inwardly disposed valve seat, a head at the other end of the body, a valve member in the body normally engaging the seat and closing the port, a compression spring between the valve member and the head serving to normally yieldingly urge the valve member into sealing engagement on the seat, and exhaust ports in the body to allow for the escape of fluid pressure from within the body when the valve member is urged out of engagement over the port.

With the ordinary relief valve, such as is set forth above, where the compression spring bears directly on the valve member, the spring continues to urge the valve member towards the seat when the valve opens, resisting lifting or shifting of the valve member from the seat, with the result that the valve does not open wide for rapid and free flow and escape of gases under pressure through and from the construction, but instead, chokes down and slowly bleeds off the said gases until the desired pressure is attained.

A further object of my invention is to provide a novel valve construction which is easy and economical to manufacture and which is both highly effective and dependable in operation.

The various objects and features of my invention will be fully understood from the following detailed description of typical preferred forms and applications of the invention, throughout which description reference is made to the accompanying drawings, in which.

Figure 1:
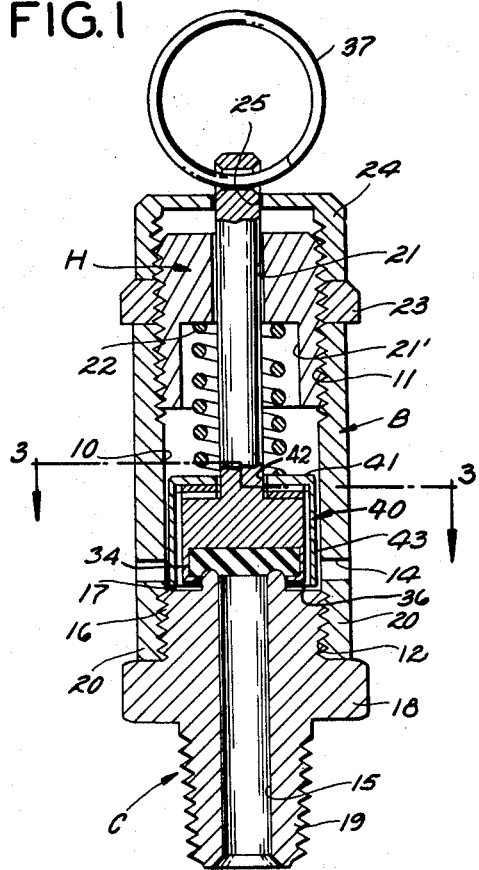
FIG. 1 is a longitudinal detailed sectional view of my new valve construction, showing it in an unactuated position.

The valve construction A that I provide includes, generally, an elongate vertically disposed body B having a central longitudinal bore 10. The upper and lower portions of the body are internally threaded as indicated at 11 and 12 and the wall of the body is provided with one or more radial exhaust ports 14, which ports are positioned in the lower portion of the body above the threads 13 therein.

A closure or base C is related to the lower end of the body and is shown as an elongate vertically disposed unitary part having a central longitudinal flow passage 15, an externally threaded upper portion 16 with a flat top 17, an enlarged tool engaging central portion 18, polygonal in cross-section, and an externally threaded lower portion or nipple 19 adapted to be engaged in a threaded opening in a pressure vessel, or the like (not shown), to communicate with the interior thereof.

The upper end or top 17 of the upper portion 16 of the base C is provided with an annular upwardly projecting valve seat 20 concentric with and surrounding the upper open end of the flow passage 15. The upper portion 16 of the base C is threaded into the lower portion of the body B and to a point where the central portion 18 of the base stops against the lower end of the body, as clearly illustrated in the drawings. In practice, the body and the base could be formed integrally, as by a suitable machining operation, in which case the top 17 of the base portion would be a flat bottom in the bore 10.

The upper end of the body B is closed by an elongate externally threaded head H having a central longitudinal opening 21 and a downwardly opening socket 21′, concentric with the opening and terminating at a flat, downwardly disposed bottom 22.

The head H is threadedly engaged in the upper portion of the body, as shown in the drawings, and is adapted to be advanced longitudinally in the body to adjust or set the pressure at which the valve opens, as will hereinafter be described.

In the preferred carrying out of the invention, and as illustrated in the drawings, the head H projects upwardly from the body B and carries a suitable lock nut 23, which nut engages the upper end of the body.

Further, in practice, a suitable cap 24 can be threaded on the upper end of the head H above the lock nut, to act as a supplemental locking means, and also to shield and make inaccessible the upper end of the head.

The cap 24 is provided with a central opening 25, in line with the opening 20 in the head and through which a valve stem, which will hereinafter be described, projects.

Arranged within the body is an elongate vertically disposed cylindrical valve member 30 having flat top and bottom ends 31 and 32, and a central, elongate, vertically disposed valve stem 33 projecting upwardly from the top 31.

The lower end of the valve member has a downwardly projecting annular retaining flange 34 cooperating with the bottom to define a socket in which a disc-shaped rubber gasket 35 is engaged. The lower edge of the flange 34 is suitably rolled or turned radially inwardly, as indicated at 36, to overlie the outer peripheral portion of the lower surface of the gasket 35 and to retain the gasket in engagement on the bottom of the valve member.

The valve member is considerably less in diametric extent than the bore 10 of the body B, and is normally in the lower portion of the body where the gasket 35 seats on the valve seat 20 on the base C as clearly illustrated in FIG. 1 of the drawings.

The stem 33 projects freely upwardly through the openings 20 and 25 in the head H and cap 24 and is shown provided at its upper end with a manual operating ring 37.

Arranged in the body B to occur about and overlie the valve member 30 is an inverted cup-shaped actuator 40. The actuator 40 has a flat disc-shaped top wall 41 with a central opening 42 to freely receive the stem 33 and an annular depending side wall or skirt 43 extending freely into the annulus between the bore 10 of the body and the valve member 30. The lower end of the actuator normally occurs below the port 14 in the body.

Arranged between the top wall of the actuator and the top 31 of the valve member 30 is an annular spacer ring 45, which ring normally yieldingly urges the actuator upwardly relative to the valve member and in spaced relationship therewith.

In the case illustrated, the ring 45 is in the nature of a serpentine washer and of the general type referred to as marcelle rings.

Arranged in the body between the head and the actuator and surrounding the stem is a helical compression spring 50. The compression spring 50 normally yieldingly urges the actuator downwardly, and as a result urges the valve member downwardly and into sealing engagement upon the seat.

The spring 50 urges the valve member 30 into engagement on the seat at a predetermined force, so that the valve member will not shift upwardly until sufficient pressure is exerted on its bottom side, through the flow passage 15, to overcome the resistance of the spring 50.

In practice the resistance afforded by the spring 50 can be advantageously adjusted by advancing the head H longitudinally in the bore 10 of the body.

It will be noted that the effective cross sectional area of the valve member, that is, the area exposed to the fluid pressure in the flow passage 15, is considerably less or smaller than the diametric extent and resulting effective cross sectional area of the actuator 40.

Figure 2:
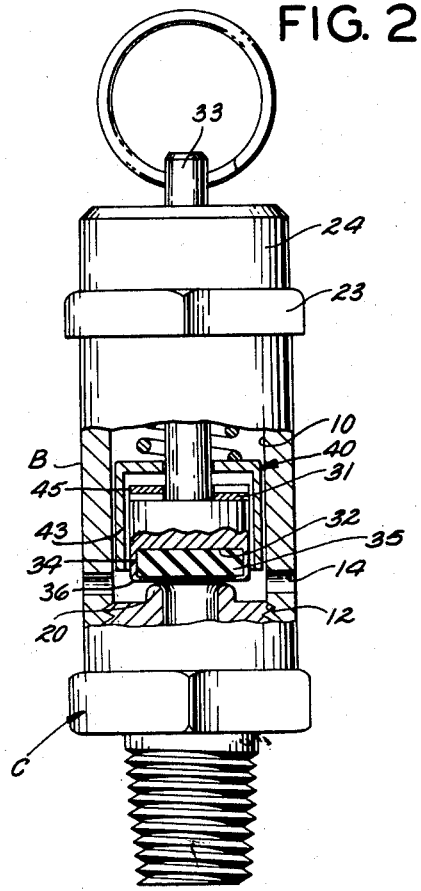
FIG. 2 is a view similar to FIG. 1 showing my new valve in an actuated position.
Figure 3:
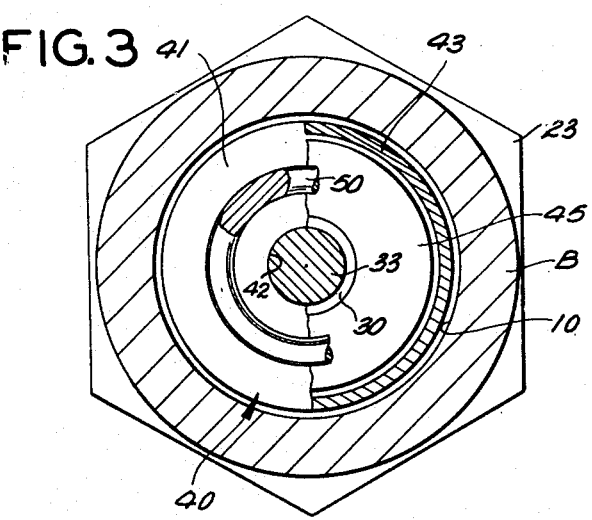
FIG. 3 is an enlarged transverse sectional view taken as indicated by line 3—3 on FIG. 1.

As soon as the valve member is cracked open, the escaping gas reacts upon the actuator 40 and urges it upwardly against the resistance of the spring 50. The actuator 40 being of considerably greater effective cross sectional area than the valve member, it more easily overcomes the resistance of the spring and shifts upwardly relative to and away from the valve member, as illustrated in FIG. 2 of the drawings, thereby unloading the valve member so as to permit it to be moved freely upwardly and away from the seat by the gases flowing through and out of the flow passage.

The actuator moves upwardly until the lower end of the skirt 42 thereof occurs adjacent the upper or top portion of the ports 14 in the body. When the actuator reaches this point sufficient pressure is released from within the body, through the ports 14, to prevent further actuation of the actuator.

It is to be noted that sufficient clearance is provided between the stem 33 and the walls of the several openings through which it extends so that a dead air space is not established between the head and the actuator which would prevent or impede proper functioning of the construction.

Figure 4:
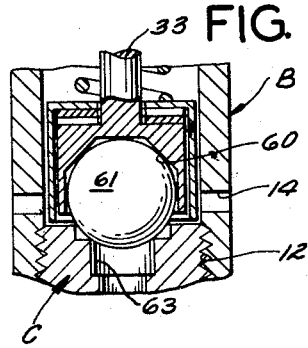
FIG. 4 is a detailed sectional view of a portion of a modified form of my invention.

In the form of the invention shown in FIG. 4 of the drawings the valve member is provided with a socket 60 in which a spherical or ball-like sealing member 61 is engaged, rather than a rubber gasket such as is provided in the first form of the invention.

Further, in the second form of the invention, the base C is provided with an annular upwardly opening socket 63 in which the sealing member 61 seats, rather than an upwardly projecting annular seat such as is provided in the first form of the invention.

The distinct sealing means shown in the second form of the invention is provided for use in situations where extreme heat, or other factors, may be encountered which would adversely affect a rubber gasket, such as is employed in the first form of the invention.

Having described only typical preferred forms and applications of my invention, I do not wish to be limited or restricted to the specific details herein set forth, but wish to preserve to myself any variations or modifications that may appear to those skilled in the art and fall within the scope of the following claims.

I claim:

1. A pressure relief valve including an elongate body with an elongate vertically disposed bore terminating at a flat bottom, a central flow passage continuing downwardly from said bottom, an annular upwardly projecting valve seat on the bottom surrounding the upper open end of the flow passage, and a lateral outlet port in the body adjacent said bottom, a head engaged in and closing the upper end of the body and having a central stem-receiving opening, an elongate valve member having upper and lower ends and an elongate stem arranged in the body with its bottom end normally engaging the seat on the bottom of the bore and closing the flow passage and with the stem projecting upwardly through the opening in the head, a cup-shaped actuator having a top wall with a central stem-receiving opening arranged in the body to normally occur adjacent the upper end of the valve member and a depending skirt extending freely into the annulus between the bore and the valve member and terminating in the bore below the outlet port, a spacer ring between the top wall of the actuator and the valve member, and a compression spring between the head and the actuator normally yieldingly urging the actuator and the valve member downwardly, said actuator being greater in effective cross-sectional area than the valve member, whereby said actuator shifts upwardly away from the valve member and against the resistance of the spring when the valve member is urged upwardly and away from the seat by fluid pressure within the passage.

2. A pressure relief valve including an elongate body with an elongate vertically disposed bore terminating at a flat bottom, a central flow passage continuing downwardly from said bottom, an annular upwardly projecting valve seat on the bottom surrounding the upper open end of the flow passage, and a lateral outlet port in the body adjacent said bottom, a head engaged in and closing the upper end of the body and having a central stem-receiving opening, an elongate valve member having upper and lower ends and an elongate stem projecting upwardly from the upper end and a resilient gasket at the lower end arranged in the body with the gasket normally engaging the seat on the bottom of the bore and closing the flow passage and with the stem projecting upwardly through the opening in the head, a cup-shaped actuator having a top wall with a central stem-receiving opening arranged in the body to normally occur adjacent the upper end of the valve member and a skirt depending freely into the annulus between the bore and the valve member and terminating in the bore below the outlet port, a spacer ring between the top wall of the actuator and the valve member, and a compression spring between the head and the actuator normally yieldingly urging the actuator and the valve member downwardly, said actuator being greater in effective cross-sectional area than the valve member, whereby said actuator shifts upwardly away from the valve member and against the resistance of the spring when the valve member is urged upwardly and away from the seat by fluid pressure within the passage.

3. A pressure relief valve including an elongate body with an elongate vertically disposed bore terminating at a flat bottom, a central flow passage continuing downwardly from said bottom, an annular upwardly disposed valve seat concentric within the flow passage, and a lateral outlet port in the body adjacent said bottom, a head engaged in and closing the upper end of the body and having a central stem-receiving opening, an elongate valve member having upper and lower ends and an elongate stem projecting upwardly from the upper end and a spherical sealing member carried by the valve member and projecting from the bottom thereof and arranged in the body with its bottom end normally engaging the seat at the bottom of the bore and closing the flow passage and with the stem projecting upwardly through the opening in the head, a cup-shaped actuator having a top wall with a central stem-receiving opening arranged in the body to normally occur adjacent the upper end of the valve member and a depending skirt extending freely into the annulus between the bore and the valve member and terminating in the bore below the outlet port, a spacer ring between the top wall of the actuator and the valve member, and a compression spring between the head and the actuator normally yieldingly urging the actuator and the valve member downwardly, said actuator being greater in cross-sectional area than the valve member, whereby said actuator shifts upwardly away from the valve member and against the resistance of the spring when the valve member is urged upwardly and away from the seat by fluid pressure within the passage.

4. A pressure relief valve including an elongate vertically disposed body with an elongate vertical bore and a lateral exhaust port in its lower portion and communicating with the bore, a base member with a flat top, a central longitudinal flow passage and an annular seat at the top surrounding the flow passage, engaged in and closing the lower end of the bore and adapted to communicate with a pressure system, a head with a central stem-receiving opening threadedly engaged in and closing the upper end of the body and adapted to be shifted longitudinally therein, a lock nut on the head and engaging the upper end of the body, an elongate valve member having upper and lower ends and an elongate stem arranged in the body with the bottom end normally seated with the seat at the top of the base and closing the flow passage and with the stem projecting upwardly through the opening in the head, a cup-shaped actuator having a top wall with a central stem-receiving opening arranged in the body to normally occur adjacent the upper end of the valve member and a depending skirt extending freely into the annulus between the bore and the valve member and terminating in the bore below the outlet port, a spacer ring between the top of the actuator and the valve member, and a compression spring between the head and the actuator normally yieldingly urging the actuator and valve member downwardly, said actuator being greater in effective cross-sectional area than the valve member, whereby said actuator shifts upwardly away from the valve member and against the resistance of the spring when the valve member is urged upwardly away from the seat by the flow of fluid pressure within the flow passage.

5. A pressure relief valve including an elongate vertically disposed body with an elongate vertical bore and a lateral exhaust port in its lower portion and communicating with the bore, a base member with a flat top, a central longitudinal flow passage and an annular seat at the top surrounding the flow passage, engaged in and closing the lower end of the bore and adapted to communicate with a pressure system, a head with a central stem-receiving opening threadedly engaged in and closing the upper end of the body and adapted to be shifted longitudinally therein, a lock nut on the head and engaging the upper end of the body, an elongate valve member having upper and lower ends and an elongate stem projecting upwardly from the upper end and a resilient gasket at the lower end arranged in the body with the gasket normally seated with the seat at the top of the base and closing the flow passage and with the stem projecting upwardly through the opening in the head, a cup-shaped actuator having a top wall with a central stem-receiving opening arranged in the body to normally occur adjacent the upper end of the valve member a skirt depending freely into the annulus between the bore and the valve member and terminating in the bore below the outlet port, a spacer ring between the top of the actuator and the valve member, and a compression spring between the head and the actuator normally yieldingly urging the actuator and valve member downwardly, said actuator being greater in effective cross-sectional area than the valve member, whereby said actuator shifts upwardly away from the valve member and against the resistance of the spring when the valve member is urged upwardly away from the seat by the flow of fluid pressure within the flow passage.

6. A pressure relief valve including an elongate vertically disposed body with an elongate vertical bore and a lateral exhaust port in its lower portion and communicating with the bore, a base member with a flat top, a central longitudinal flow passage and an annular seat at the top surrounding the flow passage, engaged in and closing the lower end of the bore and adapted to communicate with a pressure system, a head with a central stem-receiving opening threadedly engaged in and closing the upper end of the body and adapted to be shifted longitudinally therein, a lock nut on the head engaging the upper end of the body, an elongate valve member having upper and lower ends and an elongate stem projecting upwardly from the upper end and a spherical sealing member carried by the valve member and projecting from the bottom thereof and arranged in the body with the bottom end normally seated with the seat at the top of the base and closing the flow passage, and with the stem projecting upwardly through the opening in the head, a cup-shaped actuator having a top wall with a central stem-receiving opening arranged in the body to normally occur adjacent the upper end of the valve member and a skirt depending from the top wall and extending freely between the bore and the valve member and to terminate in the bore below the outlet port, a spacer ring between the top of the actuator and the valve member, and a compression spring between the head and the actuator normally yieldingly urging the actuator and valve member downwardly, said actuator being greater in effective cross-sectional area than the valve member, whereby said actuator shifts upwardly away from the valve member and against the resistance of the spring when the valve member is urged upwardly away from the seat by the flow of fluid pressure within the passage.

References Cited by the Examiner

UNITED STATES PATENTS

| 2,292,294 | 8/42 | Rotter et al. | 137—536 XR |
| 2,364,812 | 12/44 | Pierson | 137—469 |
| 2,420,370 | 5/47 | Hamilton | 137—469 |
| 2,655,173 | 10/53 | Overbeke | 137—469 |
| 3,053,270 | 9/62 | Campbell | 137—539.5 XR |
| 3,055,388 | 9/62 | Tebb et al. | 137—469 |

FOREIGN PATENTS

| 813,229 | 5/37 | France. |
| 597,093 | 5/34 | Germany. |

ISADOR WEIL, *Primary Examiner.*

MARTIN P. SCHWADRON, *Examiner.*